United States Patent [19]
Gill

[11] Patent Number: 5,291,216
[45] Date of Patent: Mar. 1, 1994

[54] MULTI-TRACE CHART RECORDER

[75] Inventor: Thomas Gill, Anaheim, Calif.

[73] Assignee: Transit Services, Inc., Long Beach, Calif.

[21] Appl. No.: 788,132

[22] Filed: Nov. 5, 1991

[51] Int. Cl.⁵ .............................. G01D 9/00
[52] U.S. Cl. .................... 346/1.1; 346/46; 346/49; 346/135.1
[58] Field of Search ......... 346/139 R, 139 C, 140 A, 346/49, 1.1, 24, 46, 51, 52, 56, 77 R, 135.1; 33/1.81, 1 M

[56] References Cited

U.S. PATENT DOCUMENTS

| | | |
|---|---|---|
| 1,641,199 | 9/1927 | Roucka . |
| 1,782,525 | 11/1930 | Allen . |
| 2,740,296 | 4/1956 | Andres ........................ 346/77 R |
| 3,035,267 | 5/1962 | Vögtlin ........................ 346/77 R |
| 3,175,221 | 3/1965 | Hammett . |
| 3,316,554 | 4/1967 | Parker, Jr. . |
| 3,409,898 | 11/1968 | Davies . |
| 3,624,654 | 11/1971 | Vogtlin . |
| 3,778,840 | 12/1973 | Rahl ............................ 346/49 X |
| 3,821,747 | 6/1974 | Mason ......................... 346/139 X |
| 4,164,744 | 8/1979 | Freude . |
| 4,433,338 | 2/1984 | Nakagawa . |
| 4,591,872 | 5/1986 | Cooper . |
| 4,677,572 | 6/1987 | Gunderson et al. ........... 346/49 X |

OTHER PUBLICATIONS

Streifler, *Coast and Geodetic Survey*, Photogrammetric Engineering, vol. 3, No. 2, Apr. 1957, pp. 330-334.

*Primary Examiner*—Benjamin R. Fuller
*Assistant Examiner*—J. Barlow, Jr.
*Attorney, Agent, or Firm*—Arthur Freilich; Robert D. Hornbaker; Leon D. Rosen

[57] ABSTRACT

A simple chart recorder is described of the type which includes a strip of pressure-markable chart paper, which includes two pressure marking styluses that create traces that can be readily distinguished from one another. Each stylus has a horizontal inner portion (80, FIG. 2) that extends largely parallel to chart paper movement and a vertical outer portion (88), with the first stylus having an inner portion lying above the second stylus and having an outer portion lying further downpath than the second stylus. One of the styluses includes a blue pencil lead (92) whose point creates a pressure-marked trace part (116, FIG. 3) as well as blue lines (120, 122) on opposite sides of the trace part. Another stylus includes a wheel (180, FIG. 6) with a plurality of points spaced about its periphery to produce a multipoint trace (172). Another stylus includes two closely-spaced tips (200, 202, FIG. 7) that form a doubleline trace (208). Another stylus has a tip with a large radius of curvature (R1, FIG. 9) to form an unusually wide pressure-marked trace (250). A jiggle device (234, FIG. 8) can be coupled to one of the stylus moving mechanisms to produce a trace with jiggles (221). Another stylus includes a lift mechanism (142, FIG. 4) which repeatedly lifts the stylus to produce a dashed trace (144).

8 Claims, 2 Drawing Sheets

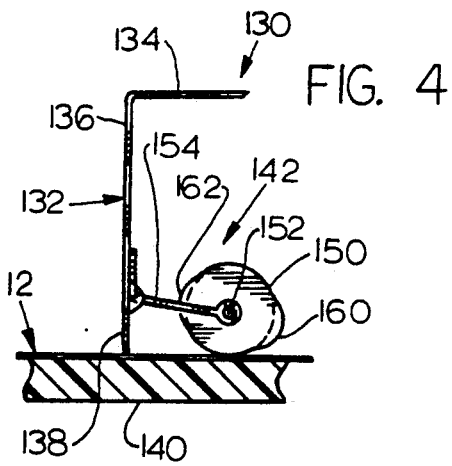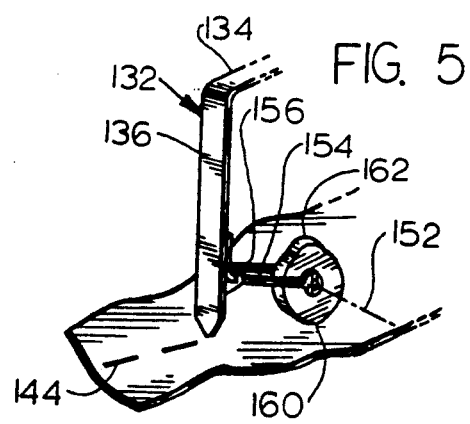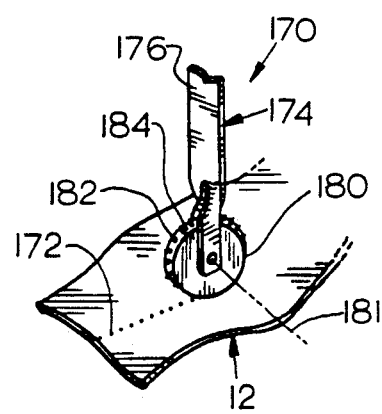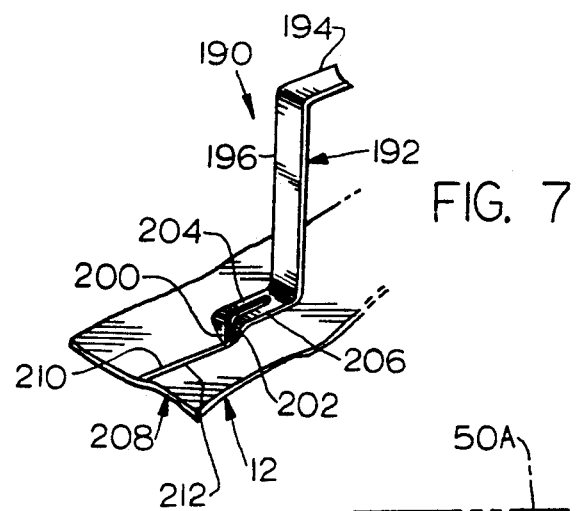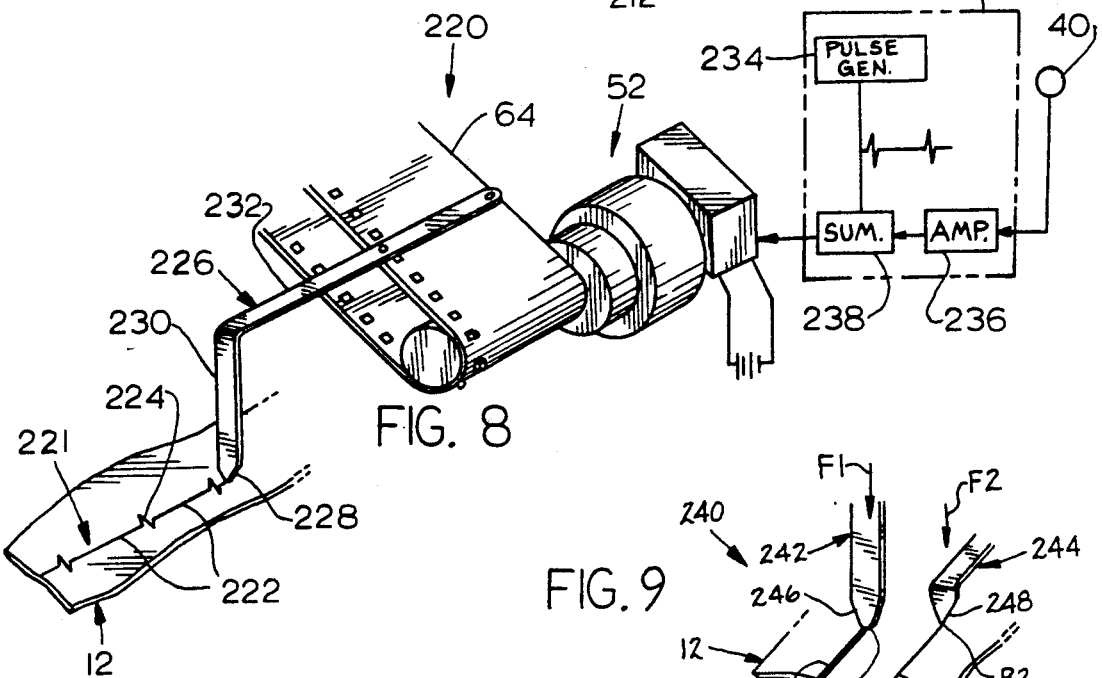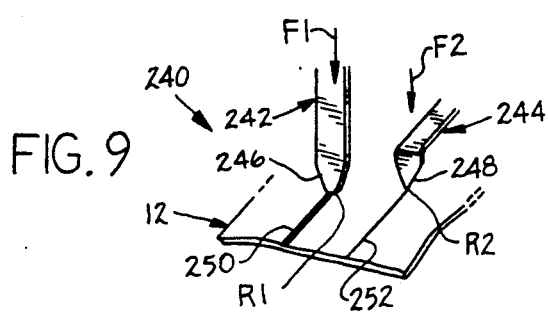

MULTI-TRACE CHART RECORDER

BACKGROUND OF THE INVENTION

Low cost strip chart recorders are often used to record the temperature of a cargo during transport. Such chart recorders must be constructed at very low cost, and generally use pressure-markable chart paper. A common type of pressure-markable chart paper includes a base of black color and a film of white opaque wax on the base, the wax being readily removable by the point of a stylus. Another type of pressure-markable paper includes a layer of microscopic ink-filled capsules that are broken by a stylus to record a trace.

Previously, the temperature sensor for the strip chart recorder was attached to the recorder housing to measure the temperature at the recorder. However, there are many instances where two or more different temperatures of other environmental conditions must be measured, such as the temperatures at inside walls of a truck or other large container rather than just at the chart recorder that may lie in the middle of the container or at only one wall. If a single low-cost chart recorder with a narrow strip of chart paper is to be used, then the traces representing the two measurements will both be capable of lying anywhere across substantially the entire width of the same strip of chart paper. This can cause the pressure-marked traces to sometimes cross each other, making it difficult to distinguish one trace representing the temperature at one location, from another trace representing the temperature at another location. Apparatus which enabled two or more different styluses to be moved independently across most of the width of a strip of chart paper without interference from each other, and which allowed each trace to be readily distinguished from one or more other traces, and which still enabled the chart recorder to be constructed at low cost, would be of considerable value.

SUMMARY OF THE INVENTION

In accordance with one embodiment of the present invention, a low cost chart recorder is provided which produces at least two easily distinguishable pressure-marked traces on a strip of pressure-markable chart paper. First and second styluses, which produce two independent traces, each includes an inner portion that lies above the strip of chart paper and extends largely parallel to it, and an outer portion that extends largely vertically and that includes at least one chart-marking point. The inner portion of a first stylus lies further from the chart paper than the inner portion of a second stylus, and the outer portion of the first stylus lies further downpath than the outer portion of the second stylus.

One of the styluses includes a length of pencil lead of a color such as blue which is distinctively different from the color of the dark (black) base of the pressure-markable chart paper. Such stylus produces a pressure-marked trace that includes thin blue lines on either side of the pressure-marked trace part, by depositing of pencil lead on the wax film that lies over the base of the chart paper. Another stylus includes a wheel with multiple points spaced about its periphery and that engages the chart paper to form a multi-point trace comprising a series of points pressure-marked in the chart paper. Another stylus includes two closely-spaced tips that each presses against the chart paper to form a double-line trace. Another stylus has a tip with a larger-than-usual radius of curvature which is pressed hard towards the paper, to form a wide pressure-marked trace. The recorder can include a jiggle means coupled to one of the styluses, for deflecting the stylus sidewardly at regular intervals, to produce a trace with jiggles that distinguish it from any other trace. The recorder can include a lift mechanism coupled to one of the styluses, which moves the stylus repeatedly off and then back against the chart paper, to produce a dashed trace. The lift mechanism can include a wheel that rolls on the chart paper and that has at least one lifter portion that raises the stylus at least once every wheel rotation.

The novel features of the invention are set forth with particularity in the appended claims. The invention will be best understood from the following description when read in conjunction with the accompanying drawings.

BRIEF DESCRIPTION OF THE DRAWINGS

FIG. 4 is a partial side elevation view of a marking station constructed in accordance with a second embodiment of the invention which produces a dashed trace, showing the stylus bearing against the chart paper.

FIG. 5 is a partial isometric view of the marking station of FIG. 4, with the stylus tip lifted off the chart paper.

FIG. 6 is a partial isometric view of a marking station constructed in accordance with a third embodiment of the invention, which produces a multipoint trace.

FIG. 7 is a partial isometric view of a marking station constructed in accordance with a fourth embodiment of the invention, which produces a double-line trace.

FIG. 8 is a partial isometric and block diagram view of a marking station constructed in accordance with a fifth embodiment of the invention, which produces a jiggled trace.

FIG. 9 is a partial isometric view of a marking station constructed in accordance with a sixth embodiment of the invention, which produces two traces of different widths.

DESCRIPTION OF THE PREFERRED EMBODIMENTS

Figure 1:
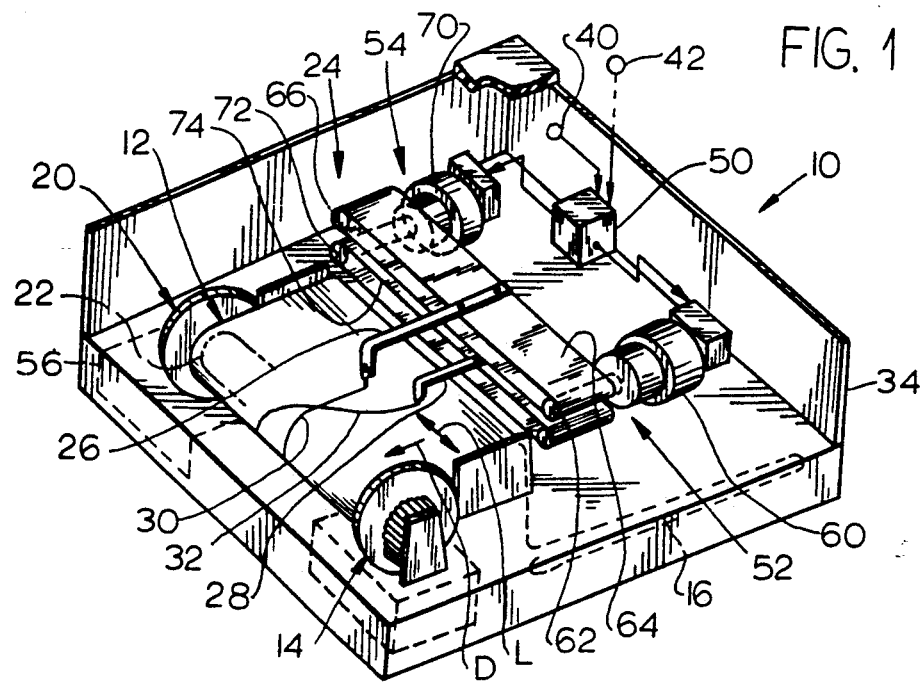
FIG. 1 is a partially sectional isometric view of a dual trace chart recorder constructed in accordance with one embodiment of the present invention.

FIG. 1 illustrates a strip chart recorder 10 which includes a strip of pressure-markable chart paper 12 that is moved by a transport 14 from a supply region 16 that holds the paper in multiple loose folds to a takeup region 20 that winds up the paper onto a roller 22. The transport moves the chart paper in a downpath direction D past a marking station 24. A plurality of styluses including a first stylus 26 and second stylus 28 are located at the marking station. Each stylus marks the chart paper by pressing against it to pressure mark it and leave a pressure-marked trace 30, 32. The marking station, supply and takeup regions, and transport, are all located within a housing 34 of the recorder.

The chart recorder may be used by mounting it in a storage container filled with perishable goods that are to be shipped as by refrigerated truck or other vehicle. The chart recorder include two temperature sensors 40, 42, with the sensor 40 located at a wall of the housing, and the other sensor 42 located at a remote location such as in goods lying near a wall of the container. Thus, one of the traces may represent the temperature at the recorder, while the other trace may represent the temperature at another location of the goods being shipped. Additional sensors and styluses may be used to create additional traces on the chart paper to indicate the temperature (or magnitude of some other condition) on the same chart paper. If there is damage to the goods from an excessive temperature, the time at which such excess temperature occurred can be determined, to determine the responsible party. The fact that a party who allows a temperature to rise excessively can be determined, helps assure that each party handling the cargo will take steps to assure that a sufficiently low temperature will be maintained.

Chart recorders of the above general type are sold or rented at low cost, and are sometimes subjected to rough handling. The use of pressure-markable chart paper enables the use of low cost marking stations that can withstand rough handling. Two types of pressure-markable chart paper are commonly available, one type including a base with a black or other dark upper surface, and an opaque wax film of another color such as white. When a pointed stylus is slowly dragged along the surface, it displaces wax to leave a dark pressure-marked trace. Another type of pressure markable paper commonly available includes microscopic ink-filled capsules. The walls of the capsules are broken by pressure applied to the paper, to release the ink that forms a pressure-marked trace. Where two or more styluses are to be used to mark two or more separate traces on a single strip of chart paper, it is necessary to be able to distinguish one trace from the other, especially where the traces often extend close to each other and cross one another. The present invention relates to apparatus for forming an easily distinguished pressure-markable trace.

Each of the temperature sensors 40, 42 comprises a resistor whose resistance varies with temperature, and wherein the voltage drop across the resistor indicates temperature. The voltage drops are sensed by an electronic circuit 50 which amplifies the signals and delivers each to one of two stylus moving devices 52, 54 which move corresponding ones of the styluses. Each stylus moving device is powered by a battery pack 56 which also powers the transport 14 that moves the chart paper. The first stylus moving device 52 includes a stepper-type motor 60 which turns a pulley 62 that moves a belt 64 that extends between the pulley 62 and an idler 66. The stylus 26 is fixed to the belt 64, so that movement of the belt causes the stylus to move in lateral directions L that are perpendicular to the downpath direction D and which move the stylus across most of the width of the chart paper. The second stylus moving device 54 is similarly constructed, with a motor 70 that moves a pulley 72 that moves a belt 74 to move the second stylus 28 laterally across the chart paper.

Figure 2:
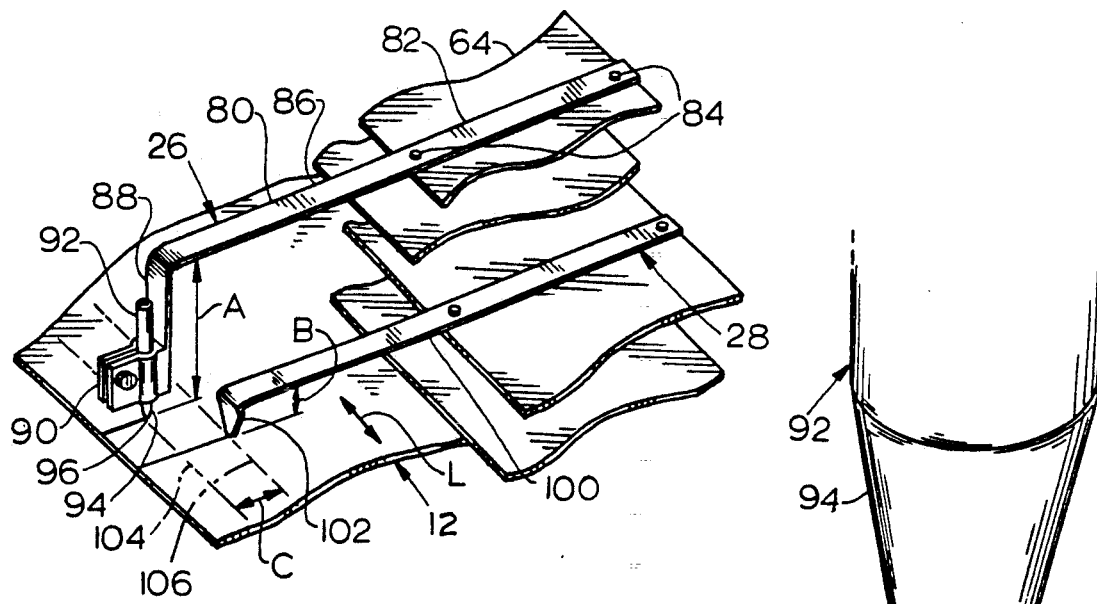
FIG. 2 is a partial isometric view showing a portion of the chart recorder of FIG. 1.

As shown in FIG. 2, the first stylus 26 includes an inner portion 80 having one end part 82 fixed at points 84 to the belt 64, and having another part 86 extending downpath a considerable distance, and merging with an outer portion 88 that extends downwardly towards the chart paper. The outer portion 88 includes a holder 90 that holds a length of blue pencil lead 92 that has a pointed chart marking portion 94. The downpath part 86 of the stylus is under a bending force to assure that the pencil lead point 96 presses firmly against the chart paper to pressure mark it. The second stylus 28 i similar to the first one, in that it has a horizontal inner portion 100 and a vertical outer portion 102 with a pointed end 104 that presses firmly against the chart paper to pressure mark it. However, the pointed end 104 is of the prior art type. The inner portion 80 of the first stylus lies a larger distance A above the chart paper than the distance B of the second stylus inner portion 100. Also, the outer portion 88 of the first stylus lies downpath a distance C from the position of the outer portion 102 of the second stylus. This permits the outer portion of the second stylus to pass along the lateral directions L across the point of the second stylus. Because both styluses are mounted on a belt, each moves in a corresponding linear path 104, 106 across the width of the chart paper. It may be noted that other types of stylus moving devices may move the stylus in an arc.

Figure 3:
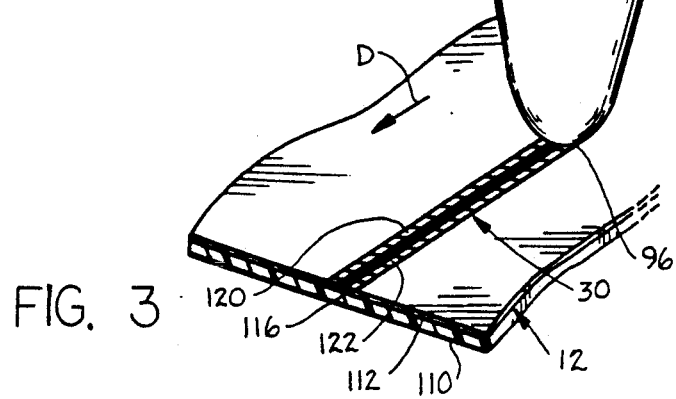
FIG. 3 is an enlarged isometric view of a portion of the recorder of FIG. 2, showing the tip of a pencil lead and the trace formed by it on the chart paper, with two lines hatched to indicate the color blue.

FIG. 3 illustrates details of part of the blue pencil lead 92 and of the first trace 30 marked by it on the chart paper 12. The chart paper includes a base 110 with an upper surface of a dark color such as black, an a film of opaque wax 112 of a light color such as white. When the extreme tip 96 of the pencil lead presses down against the paper while the paper moves slowly in the downpath direction D, the tip scrapes away some of the wax to leave a pressure marked trace part 116 where the upper surface of the base can be seen by the fact that the wax has been scraped away from it. A portion of the material of the blue lead 92 is deposited on either side of the pressure-marked trace part 116 to leave deposit lines 120, 122 of a blue color on either side of the black pressure-marked trace part 116. In tests that applicants have made, they found that the color of the deposit lines 120, 122 were not as distinctive as lines that would be made on ordinary paper by blue lead, but that the deposit lines had sufficient color that they could be readily distinguished from the second trace which did not have such blue deposit lines. The length of the chart paper may be a couple of meters long, and the pencil lead can be sharpened between each subsequent use to provide a point that makes an easily distinguished mark over the length of a single strip of chart paper.

Of course, other colored depositable material can be used besides blue pencil lead, such as pencil leads of red, orange, or other color, or other depositable material. However, any device that deposits a colored material on the chart paper, should also apply sufficient concentrated pressure to form a pressure marked trace portion, by scraping away wax or by breaking microscopic capsules containing ink.

FIGS. 4 and 5 illustrate a marking station 130 which includes two or more styluses, wherein a first stylus 132 has an inner portion 134 of the same shape and mounted in the same way as the first stylus of FIG. 2. The outer portion 136 has a pointed lower end 138 that presses against the chart paper 12 to press it against a platen 140 that the chart paper moves across at the marking station. A lift mechanism 142 is provided that is coupled to the outer portion of the first stylus and which moves the point of the stylus repeatedly off and then against the chart paper to produce a dashed trace 144 comprising a series of spaced dashes, that can be readily distinguished from a continuous trace. The lift mechanism includes a wheel 150 of high friction material such as rubber that contacts the upper surface of the slowly moving chart paper 12, which causes the wheel to slowly rotate about its axis 152. A pair of couplings 154, 156 couple the wheel 150 to the outer portion 136 of the stylus, the particular coupling 154 being a resiliently bendable beam. The wheel has projecting or raised lifter portions 160, 162 at its periphery that extend further from the wheel axis 152 than other portions of the wheel periphery, to repeatedly raise and lower the wheel axis 152 and therefore repeatedly urge the outer portion 136 of the stylus to move up and down. The resilience of the couplings 154, 156 relative to the bending and resilience of the stylus inner portion 134 is chosen to assure that the stylus will create a mark every time it is lowered and will be lifted sufficiently to not create a mark when the lifting portion rolls on the paper. It is also possible to use a wheel with a round periphery and with separate lifting portion on which the couplings press.

FIG. 6 illustrates another marking station 170 which produces a multi-point trace 172 comprising a series of dots. The station includes a stylus 174 with an inner portion similar to that of the stylus 26 of FIG. 2, but with an outer portion 176 that supports a multi-pointed wheel 180 in rotation about an axis 181. The wheel 180 has multiple points 182 spaced about its periphery 184 and is pressed down against the chart paper 12. Each of the points displaces a small region of the wax, to expose a small region of the dark base thereunder. While the points can be circular, it is also possible to use points of distinctive shape, such as points in the shape of rectangles or stars, to enable the traces formed by different styluses having wheels with different shape points, to be distinguished from one another.

FIG. 7 illustrates another marking station 190 which includes a stylus 192 having an inner portion 194 similar to the inner portion of the stylus 26 of FIG. 2, and having an outer portion 196 whose lower part forms two closely spaced tips 200, 202. Each tip lies at the downstream end of a separate short arm 204, 206 to assure that each tip presses firmly against the chart paper somewhat independently of the other tip. The two tips form a double line trace 208 that can be readily distinguished from other traces. Applicant prefers to use the space between the two pressure-marked trace parts 210, 212 to signify the magnitude of the temperature or other phenomena being recorded. The spacing of the tips should be much less than one-tenth the width of the chart paper.

FIG. 8 illustrates another marking station 220 which produces a "jiggled" pressure marked trace 221 that comprises line segments 222 separated by obvious sharp deviations or jiggles 224. The marking station includes a stylus 226 largely similar to that of FIG. 2 except that it does not carry a pencil point, but instead forms a point 228 in the metal that forms most of the outer part 230 of the stylus. The inner part 232 of the stylus is mounted on a belt 64 that is moved by a motor 52 in the same manner as that shown in FIG. 1. However, the circuitry 50A is modified, in that it includes a jiggle producing means in the form of a dual ramp pulse generator 234. The output of the temperature sensor 40 is delivered to an amplifier 236 whose output is delivered to a summing circuit 238 which also receives the output of the pulse generator 234. As a result, the output of the summing circuit 238, which is delivered to the motor 52, includes a signal representing the output of the temperature sensor 40, with spaced ramp pulses added thereto. In one example, the chart paper 12 moves in the downpath direction at a rate of one millimeter per minute. The pulse generator 232 generates pulses at a rate of one pulse every ten minutes, with each pulse lasting 30 seconds. Of course, it is possible to also mechanically deflect the stylus.

FIG. 9 illustrates another marking station 240 which includes first and second styluses 242, 244 that each has a pointed end 246, 248 that forms a simple pressure-marked trace 250, 252 on the chart paper 12. However, while the point of the second stylus end 248 has a small radius of curvature R2 such as 0.2 millimeters, the point of the first stylus end 246 has a much larger radius of curvature R1, which is more than twice as large, such as 1.0 millimeter. In addition, the force F1 pressing down the first stylus outer portion is at least twice as great as the force F2 pressing down the outer part of the second stylus. As a result of the greater radius of curvature of the point of end 246, the pressure-marked first trace 250 is considerably wider, preferably at least twice as wide, as the width of the second trace 252 created by the sharper point.

Thus, the invention provides a low cost chart recorder, of the type that includes a strip of pressure-markable chart paper that moves slowly past a marking station, which is capable of recording a plurality of traces that are distinguishable from one another. The marking station includes at least two different styluses that each includes an inner portion that extends largely parallel to the downpath direction of chart paper movement, and an outer portion that extends vertically to the chart paper and that has at least one point that applies pressure to the chart paper to pressure mark it. The largely horizontal inner part of a first stylus lies above the inner part of the second stylus, and the largely vertical outer part of the first stylus lies further downpath than the outer portion of the second stylus, which allows the two styluses to move across the width of the chart paper independently of each other, without interference. It may be noted that it is possible for one or both styluses to extend uppath from a belt or other stylus moving mechanism, in which case the stylus with the higher inner end extends further uppath than the other, such arrangement being the equivalent of the arrangement shown. Of course, the chart recorder can be used in any orientation with respect to gravity, and terms such as "vertical" are used only to aid in the description. While the second stylus may be of the prior art type that includes a simple sharp point, the first stylus produces a distinctive pressure-marked trace. The first stylus can include a pencil lead (that may be of thin lead or thick lead that is pointed) of a distinctive color that presses against the chart paper to leave a deposit on either side of the pressure marked portion of the trace. A lift mechanism can be used that lifts and drops a stylus to produce a dashed trace. A stylus can be used which comprises a wheel with multiple points spaced about its periphery, to form a multipoint trace. A stylus can be used which has two closely-spaced tips to produce a double-line trace. The marking station can include a jiggle means that deflects an ordinary stylus point sidewardly at regular intervals, to produce a jiggled trace. The first stylus can have a tip with a much larger radius of curvature than the tip of the second stylus, and can be pressed with greater force against the chart paper, to produce a wide pressure-marked trace that can be distinguished from a narrower pressure-marked trace.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A method for recording a trace on a strip of pressure-markable chart paper, comprising the step of:
pressing a point of a piece of colored marking material against said chart paper with sufficient force to make a pressure-marked trace on said chart paper, while depositing some of said marking material on said chart paper adjacent to said pressure-marked trace, where the color of said colored marking material is different from a color of said pressure-marked trace.

2. The method described in claim 1 wherein:
said step of pressing and depositing comprises pressing an end of a length of colored pencil lead against said chart paper.

3. A simple chart recorder which includes a housing, a strip of pressure-markable chart paper in said housing that displays a trace of a first color where a point has been dragged along said chart paper, a marking station in said housing, and a transport in said housing for pulling said strip in a downpath direction slowly past said marking station, characterized by:
said marking station includes first and second styluses that each press against said pressure-markable chart paper to pressure mark said chart paper, each stylus being separately moveable largely across a width of said chart paper to mark a separate trace on said chart paper;
said first stylus a quantity of depositable material of a color that is distinctly different from said first color, and a holder that holds said material and presses firmly against said chart paper to pressure mark said chart paper and form a pressure-marked trace, as well as to deposit some of said material beside said pressure-marked trace.

4. The chart recorder described in claim 3 wherein:
said quantity of depositable material comprises a length of pencil lead.

5. The chart recorder described in claim 3 wherein:
said second stylus has a simple point and includes a stylus portion that constantly biases said point toward said pressure-markable chart paper, and said marking station includes a device that repeatedly overcomes said bias and lifts said point from said chart paper and then lowers said point against said chart paper, to form a dashed pressure-marked trace on said chart paper.

6. The chart recorder described in claim 3 wherein:
said second stylus comprises a wheel with an axis and a periphery, a plurality of points spaced about said periphery, and a support that supports said wheel in rotation about said axis while continually pressing it against said chart paper to continually keep at least one of said points against said chart paper.

7. A simple chart recorder which includes a housing, a strip of pressure-markable chart paper in said housing that displays a trace of a first color where a point has been dragged along said chart paper, a marking station in said housing, and a transport in said housing for pulling said strip in a downpath direction slowly past said marking station, characterized by:
said marking station includes first and second styluses that each press against a portion of said pressure-markable chart paper to pressure mark said chart paper, and first and second stylus moving devices that each move one of said styluses separately from the other in a direction largely across a width of said chart paper portion to mark a separate trace on said chart paper;
each of said styluses has a tip, and one of said styluses has a tip with a radius of curvature that is at least twice as great as a radius of curvature of the other of said styluses to form a wider pressure-marked trace on said chart paper, said one of said styluses pressing with a force against said chart paper that is at least about twice as great as a force with which the other of said styluses presses.

8. A simple chart recorder which includes a housing, a strip of pressure-markable chart paper in said housing that displays a trace of a first color where a point has been dragged along said chart paper, a marking station in said housing, and a transport in said housing for pulling said strip in a downpath direction slowly past said marking station, characterized by:
said marking station includes a first stylus that is constantly biased to press against a portion of said pressure-markable chart paper to pressure mark said chart paper, and a first stylus moving device that moves said first stylus in a direction largely across a width of said chart paper portion to mark a trace on said chart paper;
a lift mechanism which is coupled to said first stylus, and which moves the stylus repeatedly off and back against said chart paper to produce a dashed trace consisting of a series of dashes;
said lift mechanism includes a wheel that is rotatable about a first axis and which bears against said chart paper so as said chart paper slowly moves said wheel slowly rotates, said wheel having at least one raised lifter portion, and including a coupling that extends between said stylus and said lifter wheel, so as said wheel and lifter portion rotate said stylus is repeatedly raised and lowered.

* * * * *